(12) United States Patent
Chen et al.

(10) Patent No.: US 10,999,105 B2
(45) Date of Patent: May 4, 2021

(54) CHANNEL ESTIMATION METHOD AND DEVICE

(71) Applicant: DATANG MOBILE COMMUNICATIONS EQUIPMENT CO., LTD, Beijing (CN)

(72) Inventors: Yuetan Chen, Beijing (CN); Xi Wang, Beijing (CN); Quanfei Hu, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/474,556

(22) PCT Filed: Aug. 21, 2017

(86) PCT No.: PCT/CN2017/098309
§ 371 (c)(1),
(2) Date: Jun. 28, 2019

(87) PCT Pub. No.: WO2018/120858
PCT Pub. Date: Jul. 5, 2018

(65) Prior Publication Data
US 2019/0327114 A1    Oct. 24, 2019

(30) Foreign Application Priority Data

Dec. 29, 2016    (CN) .......................... 201611248808.7

(51) Int. Cl.
*H04L 25/02* (2006.01)
*H04L 25/03* (2006.01)
*H04W 56/00* (2009.01)

(52) U.S. Cl.
CPC ........ *H04L 25/024* (2013.01); *H04L 25/0224* (2013.01); *H04L 25/03012* (2013.01); *H04W 56/0045* (2013.01)

(58) Field of Classification Search
CPC ......... H04L 25/0224; H04L 25/03012; H04W 56/0045
See application file for complete search history.

(56) References Cited

U.S. PATENT DOCUMENTS

2006/0291578 A1    12/2006  Singh et al.
2013/0022158 A1*   1/2013   Panicker ............. H04L 27/2657
                                                 375/343

FOREIGN PATENT DOCUMENTS

CN    102130864 A    7/2011
CN    102257737 A    11/2011
(Continued)

OTHER PUBLICATIONS

Peizhi An Adaptive Channel Estimation Method Based on Doppler Shift Estimation in mobile WIMAX, 2007 International Symposium on Electromagnetic Compatibility Year: 2007.*
(Continued)

*Primary Examiner* — Yemane Mesfin
*Assistant Examiner* — Henry Baron
(74) *Attorney, Agent, or Firm* — Kilpatrick Townsend & Stockton, LLP (57)    ABSTRACT

Disclosed are a channel estimation method and device for improving accuracy of channel estimation so as to improve the performance of a receiver. The present application provides a channel estimation method, comprising: determining an equivalent pilot sequence by means of a historical effective frequency offset value; determining a sequence for multiple correlation by using the equivalent pilot sequence;
(Continued)

and performing multiple correlation calculation of channel estimation by using the sequence for multiple correlation.

9 Claims, 3 Drawing Sheets

(56) References Cited

FOREIGN PATENT DOCUMENTS

| | | |
|---|---|---|
| CN | 102468911 A | 5/2012 |
| CN | 103825850 A | 5/2014 |
| CN | 105007242 A | 10/2015 |
| CN | 105024878 A | 11/2015 |
| JP | 2004165720 A | 6/2004 |
| JP | 2004357339 A | 12/2004 |
| JP | 2007208967 A | 8/2007 |
| WO | 2015000306 A1 | 1/2015 |
| WO | 2016115548 A1 | 7/2016 |

OTHER PUBLICATIONS

Guo Lizhen, "Research on the Pilot-aided OFDM Channel Estimation", the second issue of Journal of Taiyuan Urban Vocational College, Taiyuan, Shanxi, 030031, total 10 page, Feb. 2013.
Fred Buchali et al., "Towards real-time CO-OFDM transceivers"; Optical Society of America; OCIS codes: (060.4256) Networks, network optimization, (060.4080) Modulation.

* cited by examiner

CHANNEL ESTIMATION METHOD AND DEVICE

This application is a National Stage of International Application No. PCT/CN2017/098309, filed Aug. 21, 2017, which claims priority to Chinese Patent Application No. 201611248808.7, filed Dec. 29, 2016, both of which are hereby incorporated by reference in their entireties.

FIELD

The present invention relates to the field of communications, and particularly to a method and apparatus for estimating a channel.

BACKGROUND

In the exiting Long Term Evolution (LTE) system, there is a significant frequency offset of an uplink signal at a base station side while a user equipment is moving at a high speed. An uplink pilot signal is generally a sequence mapped in the frequency domain, and there is a sampling error in the frequency domain due to the significant frequency offset, thus resulting in interference between sub-carriers. And there may be a significant error of channel estimation at a receiver due to the interference between the sub-carriers.

The existing channel estimation algorithms in the base station are not applicable to the user equipment moving at a high speed. In a common channel estimation algorithm, such a time-domain windowing and noise suppressing algorithm is applied that the receiver correlates the uplink pilot signal with a locally generated reference signal sequence, and then transforms it into the time domain through Inverse Discrete Fourier Transform (IDFT), and finds a valid path according to amplitudes of paths to suppress an influence of noise. However if the original local pilot sequence is still applied in the correlation algorithm, then there will be a significant error of channel estimation due to the frequency offset, thus degrading the performance of the receiver.

SUMMARY

Embodiments of the invention provide a method and apparatus for estimating a channel so as to improve the accuracy of channel estimation to thereby improve the performance of a receiver.

An embodiment of the invention provides a method for estimating a channel, the method including:
determining an equivalent pilot sequence according to a historical valid frequency offset;
determining a sequence for multiple correlation, using the equivalent pilot sequence; and
performing multiple correlation calculation for channel estimation using the sequence for multiple correlation.

In this method, an equivalent pilot sequence is determined according to a historical valid frequency offset, a sequence for multiple correlation is determined using the equivalent pilot sequence; and calculation of multiple correlation for channel estimation is performed using the sequence for multiple correlation. As compared with the existing channel estimation solution, additional special processing can be performed for a high-speed scenario by obtaining the equivalent pilot sequence using the historical valid frequency offset to thereby alleviate a calculation error of channel estimation due to a frequency offset. Stated otherwise, in view of the problem of a sampling error in the frequency domain of the high-speed scenario, a frequency offset of a locally generated reference signal sequence (i.e., a local pilot sequence) is compensated for in advance based upon a frequency offset estimated in a historical (e.g., last) scheduling, and a local sequence that is really needed, to be correlated with a pilot sequence, is restored, thus lowering the probability that a secondary path occurs, and improving the accuracy of channel estimation in a high-speed scenario with a frequency offset. Furthermore, since the locally generated reference signal sequence is compensated for in advance (that is, the equivalent pilot sequence is determined according to the historical valid frequency offset) in the embodiment of the invention, the solution according to the embodiment of the invention can be implemented at the user level before an uplink signal arrives, that is, the inventive solution can be implemented respectively for different users so that the operation of calculating an equivalent pilot sequence can be performed before a user signal arrives, and corresponding calculation can be performed after an uplink scheduling at the Media Access Control (MAC) layer without any wait until an uplink signal is received, and thus avoiding any additional processing delay and any occupying of the processing time of the signal.

Optionally, determining the equivalent pilot sequence according to the historical valid frequency offset includes:
determining a phase complex multiplication coefficient using the historical valid frequency offset;
multiplying a local pilot sequence in the time domain with the phase complex multiplication coefficient; and
transforming the local pilot sequence in the time domain multiplied with the phase complex multiplication coefficient into the frequency domain to obtain the equivalent pilot sequence.

Optionally, the local pilot sequence in the time domain is obtained by:
determining a local pilot sequence in the frequency domain; and
transforming the local pilot sequence in the frequency domain into the local pilot sequence in the time domain.

Optionally, determining the phase complex multiplication coefficient using the historical valid frequency offset includes:
determining a phase rotation vector using the historical valid frequency offset; and
determining the phase complex multiplication coefficient according to the phase rotation vector.

Optionally, determining the sequence for multiple correlation, using the equivalent pilot sequence includes:
for each sample point of the equivalent pilot sequence, determining a square of a modulus of the sample point, dividing the sample point by the square of the modulus of the sample point to obtain the sequence for multiple correlation.

An embodiment of the invention provides an apparatus for estimating a channel, the apparatus including:
a first unit configured to determine an equivalent pilot sequence according to a historical valid frequency offset;
a second unit configured to determine a sequence for multiple correlation, using the equivalent pilot sequence; and
a third unit configured to perform multiple correlation calculation for channel estimation using the sequence for multiple correlation.

Optionally, the first unit is configured to:
determine a phase complex multiplication coefficient using the historical valid frequency offset;
multiply a local pilot sequence in the time domain with the phase complex multiplication coefficient; and transform the local pilot sequence in the time domain multiplied with the phase complex multiplication coefficient into the frequency domain to obtain the equivalent pilot sequence.

Optionally, the first unit is configured to determine the local pilot sequence in the time domain by:

determining a local pilot sequence in the frequency domain; and transforming the local pilot sequence in the frequency domain into the local pilot sequence in the time domain.

Optionally, the first unit is configured to determine the phase complex multiplication coefficient using the historical valid frequency offset by:

determining a phase rotation vector using the historical valid frequency offset; and determining the phase complex multiplication coefficient according to the phase rotation vector.

Optionally, the second unit is configured to:

determine, for each sample point of the equivalent pilot sequence, a square of a modulus of the sample point, and divide the sample point by the square of the modulus of the sample point to obtain the sequence for multiple correlation.

Another embodiment of the invention provides a computing device including a memory and a processor, where the memory is configured to store program instructions, and the processor is configured to invoke the program instructions stored in the memory to perform the method according to any one of the solutions above.

Another embodiment of the invention provides a computer storage medium storing computer executable instructions configured to cause a computer to perform the method according to any one of the solutions above.

BRIEF DESCRIPTION OF THE DRAWINGS

In order to make the technical solutions according to the embodiments of the invention more apparent, drawings to which reference is to be made in the description of the embodiments will be introduced below in brief; and apparently the drawings to be described below are only some embodiments of the invention, and those ordinarily skilled in the art can further derive other drawings from these drawings without any inventive effort.

DETAILED DESCRIPTION OF THE EMBODIMENTS

The embodiments of the invention provide a method and apparatus for estimating a channel so as to improve the accuracy of channel estimation to thereby improve the performance of a receiver.

Channel estimation is an indispensable module in an uplink coherent receiver, and intended to estimate information about a channel experienced by a signal so that an equalization module compensates for a defect factor of the channel and recovers the original transmitted signal. The time-domain windowing and noise-suppressing algorithm using Discrete Fourier Transform (DFT) is a common channel estimation algorithm in which firstly a transmitted pilot sequence is calculated locally and a received frequency pilot signal is correlated with the local sequence, and then it is transformed into the time domain through IDFT, and a valid path is selected according to a delay spread of the channel and amplitudes of respective paths to eliminate an influence of noise and interference.

A local sequence of a pilot signal is obtained by shifting a ZC sequence cyclically and offsetting the phase thereof. However there is such a significant frequency offset between a base station and a user equipment moving at a high speed that there is a sampling error in the frequency domain, thus resulting in interference between carriers, and distorting the ZC sequence in the frequency domain. If the distorted uplink signal is correlated with an ideal local ZC sequence, then there will be some secondary paths with high amplitudes due to IDFT transformation into the time domain, where these paths are not real multi-paths, and tend to be falsely detected as valid paths, thus resulting in a too large error of a channel estimation result, and thus degrading the performance of the receiver as a whole.

In the existing channel estimation algorithms, channel coefficients can be well estimated while the user equipment is moving at a low speed or immobile. However while the user equipment is moving at a high speed, the frequency offset is not treated, so channel estimation may be affected by the interference between the sub-carriers, thus seriously degrading the performance. When there is a frequency offset, the reference signal transmitted with the uplink frequency-domain pilot signal is not equivalent to the original reference signal sequence, but a reference signal sequence with the frequency offset, from the perspective of the receiver. Accordingly if the original reference signal sequence is still applied at the receiver, then there will be apparently an error of a channel estimation result.

In the technical solutions according to the embodiments of the invention, in view of the problem of a sampling error in the frequency domain while the user equipment is moving at a high speed, a frequency offset of a locally generated reference signal sequence (i.e., a local pilot sequence) is compensated for in advance based upon a frequency offset estimated in a historical (e.g., last) scheduling, and a local sequence that is really needed, to be correlated with a pilot sequence, is restored, thus lowering the probability that a secondary path occurs, and improving the accuracy of channel estimation. Furthermore, since the locally generated reference signal sequence is compensated for in advance, the inventive solutions can be implemented at the user level after an uplink scheduling at the Media Access Control (MAC) layer without any wait until an uplink signal is received, and thus avoiding any additional processing delay.

A principle of the technical solutions according to the embodiments of the invention is as follows.

Since channel estimation is performed separately for each antenna, a received uplink signal over a single antenna can be described. A fixed frequency offset of 7.5 kHz is ignored, and an uplink signal is modeled as:

$$Y=XG.$$

Where both Y and G are $N_{SC}^{RS} \times 1$ column vectors, which represent a frequency-domain signal and a frequency-domain channel response received by a base station respectively, $N_{SC}^{RS}$ represents the number of sample points of a pilot signal, the matrix X represents a $N_{SC}^{RS} \times N_{SC}^{RS}$ diagonal matrix representing a frequency-domain pilot signal, i.e., a pilot sequence, the RS stands for a Reference Signal, and the SC stands for a Sub-Carrier.

Crystal oscillators of a transmitter and a receiver may not be exactly the same, so there is some difference between generated frequencies; and since a user equipment is moving at a high speed relative to a base station, there is a Doppler effect, so there is a frequency offset between signals of the base station and the user equipment; and in order to make it convenient to represent the frequency offset between the signal received by the base station, and the signal transmitted by the user equipment in a matrix, the signal received by the base station, i.e., an uplink signal, is transformed into the time domain, and represented as:

$$y = F^H Y = F^H X G$$

Where F is a normalized Fast Fourier Transformation (FFT) matrix.

For example, there is a frequency offset f (e.g., a historical valid frequency offset as described below) between the base station and the user equipment, so there is a stepped phase rotation, i.e., $\theta(n)=2\pi f \tau n$, of each symbol at a receiver (the base station side), and there is a phase rotation in the time domain due to a frequency offset, where n represents the n-th sample point, and $\theta(n)$ is a phase rotation (i.e., a deflected phase) of the n-th sample point due to the frequency offset, where $\tau$ is an equivalent uplink sampling interval of this user. The signal model in the description of the principle in the embodiments of the invention generally refers to one transmitting user and one receiving base station. Since a plurality of users can concurrently transmit respectively in different frequency bands, there are different bandwidths of frequency bands in which the users transmit their signals, "this user" here refers to a user transmitting a signal in a frequency band occupied by the signal model, i.e., an end user.

Due to a frequency offset, the uplink signal, received by the base station, transmitted by the user equipment is represented as:

$$\hat{y} = \Lambda y = \Lambda F^H X G.$$

Where $\Lambda$ is a diagonal matrix representing phase rotation of a transmitted signal passing through a channel, and including elements diag$\{e^{j\theta}\}$, $\theta=[\theta(0), \theta(1), \ldots]$. The equation above is transformed into the frequency domain, that is, the time-domain signal received by the base station is transformed into a frequency-domain signal, and the frequency-domain signal is represented as $\hat{Y}$ defined in the equation of:

$$\hat{Y} = F\hat{y}$$
$$= F\Lambda F^H X G$$
$$= \bar{X} G.$$

Where $\bar{x} = F\Lambda F^H X$, and elements on its diagonal represent an equivalent pilot sequence. As can be apparent from this expression, firstly an IDFT operation is performed on the original pilot sequence, and then phase rotation is performed on each time-domain sample point, where the pilot sequence is a pilot sequence in the frequency domain, and transformed into the time domain through IDFT, and the sample points here are sample points of the time-domain signal into which the pilot sequence is transformed. A DFT operation is further performed thereon to transform it into the frequency domain, that is, the DFT operation is performed on the phase-rotated time-domain signal to transform it into the frequency domain, thus resulting in the equivalent pilot sequence.

Since the original pilot sequence is a sequence with a constant modulus of 1, a channel can be estimated simply by performing a multiple correlation operation on the received frequency-domain signal and the pilot sequence, but since the equivalent pilot sequence obtained is a sequence with a varying modulus, each sample point of the equivalent pilot sequence shall be divided by the square of the modulus thereof before the multiple correlation operation is performed.

Apparently in the embodiment of the invention, an equivalent pilot sequence, and a sequence for multiple correlation operation when there is a frequency offset are determined using a predicted frequency offset (i.e., the above historical valid frequency offset); and the inventive solutions can be implemented at the user level before uplink signals are arrived, that is, the solutions can be implemented for different users respectively, and the operation of calculating an equivalent pilot sequence can be performed before a user signal arrives, to thereby avoid occupying the processing time of the signal. Further, the solutions according to the embodiments of the invention can be applicable to uplink reception at the base station side of a Physical Uplink Shared Channel (PUSCH), a Physical Uplink Control Channel (PUCCH), a Sounding Reference Signal (SRS), etc.

Figure 1:
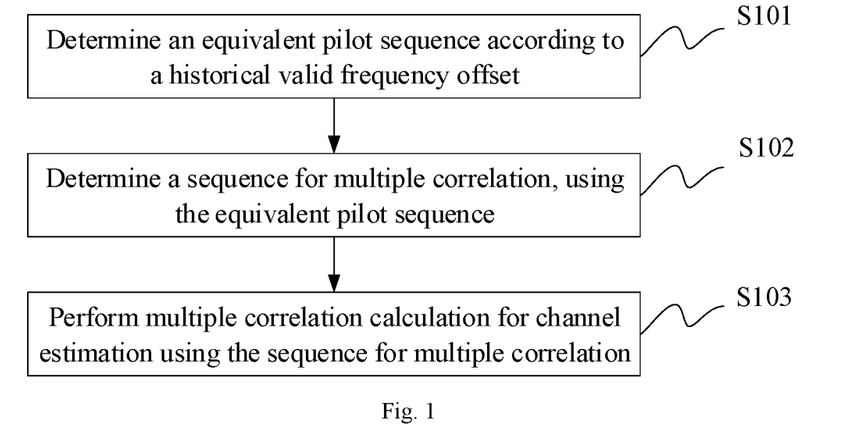
FIG. 1 is a schematic flow chart of a method for estimating a channel according to an embodiment of the invention.

Accordingly, as illustrated in FIG. 1, a method for estimating a channel according to an embodiment of the invention includes the following operations.

The operation S101 is to determine an equivalent pilot sequence according to a historical valid frequency offset.

Here the historical valid frequency offset as described in the embodiment of the invention is used for predicting a frequency offset of the current scheduling, but will not be limited to any particular frequency offset as long as it can reflect the frequency offset of the current scheduling to some extent. For example, it can be a frequency offset when this user lastly executed an uplink scheduling and performed correct decoding, or can be an average of weighted frequency offsets previously estimated by this user, etc. Further, a signal model in the description of the principle of the invention generally refers to one transmitting user and one receiving base station; and since a plurality of users can concurrently transmit respectively in different frequency bands, there are different bandwidths of frequency bands in which the users transmit their signals, and "this user" here refers to a user transmitting a signal in a frequency band occupied by the signal model.

The operation S102 is to determine a sequence for multiple correlation, using the equivalent pilot sequence.

The operation S103 is to perform multiple correlation calculation for channel estimation using the sequence for multiple correlation.

Optionally, determining the equivalent pilot sequence according to the historical valid frequency offset includes: determining a phase complex multiplication coefficient using the historical valid frequency offset; multiplying a local pilot sequence in a time domain with the phase complex multiplication coefficient; and transforming the local pilot sequence in the time domain multiplied with the phase complex multiplication coefficient into a frequency domain to obtain the equivalent pilot sequence.

Optionally, the local pilot sequence in the time domain is obtained by: determining a local pilot sequence in the frequency domain; and transforming the local pilot sequence in the frequency domain into the local pilot sequence in the time domain.

Optionally, determining the phase complex multiplication coefficient using the historical valid frequency offset includes: determining a phase rotation vector using the historical valid frequency offset; and determining the phase complex multiplication coefficient according to the phase rotation vector.

Optionally, determining the sequence for multiple correlation using the equivalent pilot sequence includes: for each sample point of the equivalent pilot sequence, determining a square of a modulus of the sample point, dividing the sample point by the square of the modulus of the sample point to obtain the sequence for multiple correlation.

Figure 2:
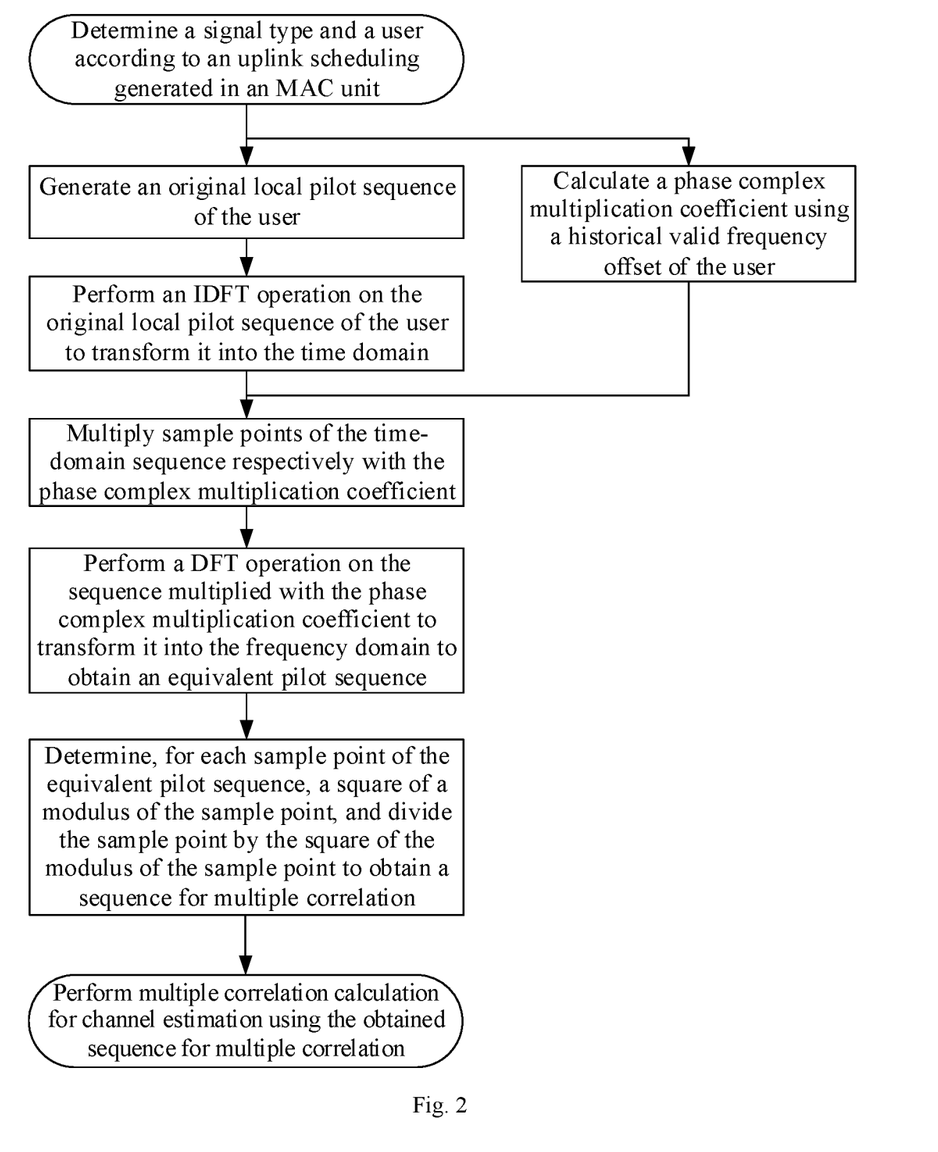
FIG. 2 is a schematic flow chart of a method for estimating a channel according to an embodiment of the invention.

A particular channel estimation flow will be exemplified, and as illustrated in FIG. 2, the method for estimating a channel according to the embodiment of the invention includes the following operations.

The first operation is to determine a signal type of a received uplink signal, and a user transmitting the uplink signal according to an uplink scheduling generated in a Media Access Control (MAC) unit.

The second operation is to generate an original local pilot sequence of the user according to the signal type, that is, to determine a local pilot sequence X in the equation of Y=XG using a model of an uplink signal Y.

This operation can be particularly performed as in the prior art, so a repeated description thereof will be omitted here.

The third operation is to perform an IDFT operation on $N_{SC}^{RS}$ points of the local pilot sequence X, that is, to convert the uplink signal Y into an uplink signal y in the time-domain in the equation of y=$F^H$Y=$F^H$XG to thereby transform the local pilot sequence from the frequency domain into the time domain.

The fourth operation is to determine a phase rotation vector θ(n) in the equation of θ(n)=2πfτn using a historical valid frequency offset f of the user, and then calculate a value of diag{$e^{jθ}$}, θ=[θ(0), θ(1), . . . ], and to further obtain a phase complex multiplication coefficient λ, where λ represents diagonal elements of the matrix Λ above, and a length of λ is $N_{SC}^{RS}$.

Here the historical valid frequency offset f is used for predicting a frequency offset of the current scheduling, but will not be limited to any particular frequency offset as long as it can reflect the frequency offset of the current scheduling to some extent. It can be a frequency offset when this user lastly executed an uplink scheduling and performed correct decoding, or can be an average of weighted frequency offsets previously estimated by this user, etc. A signal model in the description of the principle of the invention generally refers to one transmitting user and one receiving base station. Since a plurality of users can concurrently transmit respectively in different frequency bands, there are different bandwidths of frequency bands in which the users transmit their signals, and "this user" here refers to a user transmitting a signal in a frequency band occupied by the signal model.

The second operation and the third operation above can be performed concurrently with the fourth operation, but they may be performed in any sequential order as appropriate.

The fifth operation is to multiply the local pilot sequence in the time domain with the phase complex multiplication coefficient λ, that is, to determine an uplink signal ŷ, received by a base station and transmitted by the user under the influence of the historical valid frequency offset f in the equation of ŷ=Λy=Λ$F^H$XG according to the uplink signal y in the time domain, and the diagonal matrix Λ, to thereby determine the local pilot sequence in the time domain multiplied with the phase complex multiplication coefficient λ.

The sixth operation is to perform a DFT operation on the local pilot sequence in the time domain multiplied with the phase complex multiplication coefficient to obtain an equivalent pilot sequence x̌, that is, to transform the time-domain uplink signal ŷ into a frequency-domain signal Ỹ in the equation of:

$$\tilde{Y} = F\hat{y}$$
$$= F\Lambda F^H XG$$
$$= \check{X}G.$$

In this way, the equivalent pilot sequence x̌ is obtained, where x̌ =FΛ$F^H$X, and diagonal elements thereof are an equivalent pilot sequence.

The seventh operation is to determine, for each sample point of the equivalent pilot sequence x̌, the square of a modulus of the sample point, and to divide the sample point by the square of the modulus of the sample point to thereby obtain a sequence for multiple correlation.

Division in this operation can be executed using a lookup table (in the prior art).

The eighth operation is to perform multiple correlation calculation and subsequent processing for channel estimation using the obtained sequence for multiple correlation.

Here the multiple correlation calculation and the subsequent processing is known in the prior art, so a repeated description thereof will be omitted here.

Accordingly, as compared with the traditional channel estimation solution, additional special processing can be performed for the user equipment moving at a high speed to thereby improve the accuracy of channel estimation in the case of a frequency offset, that is, there is a frequency offset while the user equipment is moving at a high speed, where the frequency offset will be very large if the speed is very high, so that the frequency offset will be far above a frequency difference between crystal oscillators. There is a frequency offset while the user equipment is moving at a high speed, for example, but the embodiment of the invention will not be limited thereto. In the embodiment of the invention, the accuracy can be improved because the equivalent pilot sequence is obtained using the historical valid frequency offset to thereby alleviate a calculation error of channel estimation arising from the frequency offset.

Furthermore, the inventive solution can be implemented respectively for a plurality of users moving at a high speed, and can be applicable to reception of a plurality of types of uplink signals; the inventive solution can be implemented before a signal from a user moving at a high speed arrives, to thereby avoid a delay at a receiver; and in the embodiment of the invention, one IDFT operation, one DFT operation, a multiplication and summation operation (which is a terminology) with a complexity factor of $O(N_{SC}^{RS})$ (where a*b+c refers to a multiplication and summation operation, and a multiple correlation operation refers to a multiplication and summation operation), and a lookup table operation can be performed at a low complexity.

Figure 3:
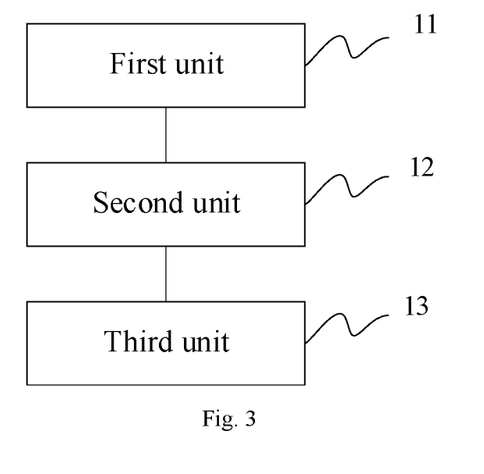
FIG. 3 is a schematic structural diagram of an apparatus for estimating a channel according to an embodiment of the invention.

In correspondence to the method above, as illustrated in FIG. 3, an apparatus for estimating a channel according to an embodiment of the invention includes: a first unit 11 configured to determine an equivalent pilot sequence according to a historical valid frequency offset; a second unit 12 configured to determine a sequence for multiple correlation, using the equivalent pilot sequence; and a third unit 13 configured to perform multiple correlation calculation for channel estimation using the sequence for multiple correlation.

Optionally, the first unit is configured to: determine a phase complex multiplication coefficient using the historical valid frequency offset; multiply a local pilot sequence in the time domain with the phase complex multiplication coefficient; and transform the local pilot sequence in the time domain multiplied with the phase complex multiplication coefficient into the frequency domain to obtain the equivalent pilot sequence.

Optionally, the first unit is configured to determine the local pilot sequence in the time domain by: determining a local pilot sequence in the frequency domain; and transforming the local pilot sequence in the frequency domain into the local pilot sequence in the time domain.

Optionally, the first unit is configured to determine the phase complex multiplication coefficient using the historical valid frequency offset by: determining a phase rotation vector using the historical valid frequency offset; and determining the phase complex multiplication coefficient according to the phase rotation vector.

Optionally, the second unit is configured to: determine, for each sample point of the equivalent pilot sequence, a square of a modulus of the sample point, and divide the sample point by the square of the modulus of the sample point to obtain the sequence for multiple correlation.

All of the first unit, the second unit, and the third unit above can be embodied in an element such as a processor, etc., and the apparatus above for estimating a channel can be a network-side device, e.g., a base station, for example.

Figure 4:
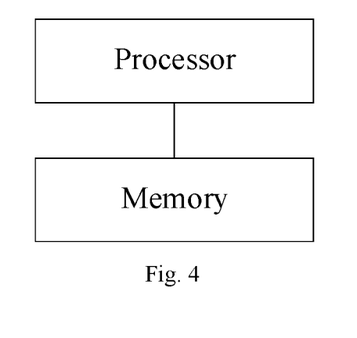
FIG. 4 is a schematic structural diagram of a computing device according to an embodiment of the invention.

An embodiment of the invention provides a computing device, which can particularly be a desktop computer, a portable computer, a smart mobile phone, a tablet computer, a Personal Digital Assistant (PDA), etc. As illustrated in FIG. 4, the computing device can include a Central Processing Unit (CPU), a memory, an input device/an output device (not illustrated), etc., where the input device can include a keyboard, a mouse, a touch panel, etc., and the output device can include a display device, e.g., a Liquid Crystal Display (LCD), a Cathode Ray Tube (CRT) display, etc.

The memory can include a Read Only Memory (ROM) and a Random Access Memory (RAM), and provide the processor with program instructions and data stored in the memory. In the embodiment of the invention, the memory can be configured to store programs for performing the method above according to the embodiment of the invention.

The processor is configured to invoke the program instructions stored in the memory, and to execute the program instructions to: determine an equivalent pilot sequence according to a historical valid frequency offset; determine a sequence for multiple correlation, using the equivalent pilot sequence; and perform calculation of multiple correlation for channel estimation using the sequence for multiple correlation.

An embodiment of the invention provides a computer storage medium configured to store computer program instructions to be executed by the computing device above, where the computer program instructions include programs for performing the method above according to the embodiment of the invention.

The computer storage medium can be any computer accessible available medium or data storage device including but not limited to a magnetic memory (e.g., a floppy disk, a hard disk, a magnetic tape, a Magnetic-Optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a Solid State Disk (SSD), etc.), etc.

In summary, as compared with the traditional channel estimation solution, additional special processing can be performed for a user moving at a high speed in the embodiments of the invention to thereby improve the accuracy of channel estimation in the case of a frequency offset.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for estimating a channel, the method comprising:
   determining an equivalent pilot sequence according to a historical valid frequency offset;
   determining a sequence for multiple correlation, using the equivalent pilot sequence; and
   performing multiple correlation calculation for channel estimation using the sequence for multiple correlation;
   wherein determining the equivalent pilot sequence according to the historical valid frequency offset comprises:
   determining a phase complex multiplication coefficient using the historical valid frequency offset;
   multiplying a local pilot sequence in a time domain with the phase complex multiplication coefficient; and
   transforming the local pilot sequence in the time domain multiplied with the phase complex multiplication coefficient into a frequency domain to obtain the equivalent pilot sequence.

2. The method according to claim 1, wherein the local pilot sequence in the time domain is obtained by:
   determining a local pilot sequence in the frequency domain; and
   transforming the local pilot sequence in the frequency domain into the local pilot sequence in the time domain.

3. The method according to claim 1, wherein determining the phase complex multiplication coefficient using the historical valid frequency offset comprises:
   determining a phase rotation vector using the historical valid frequency offset; and
   determining the phase complex multiplication coefficient according to the phase rotation vector.

4. The method according to claim 1, wherein determining the sequence for multiple correlation, using the equivalent pilot sequence comprises:
   determining, for each sample point of the equivalent pilot sequence, a square of a modulus of the sample point, and dividing the sample point by the square of the modulus of the sample point to obtain the sequence for multiple correlation.

5. An apparatus for estimating a channel, the apparatus comprising:
   a first unit configured to determine an equivalent pilot sequence according to a historical valid frequency offset;
   a second unit configured to determine a sequence for multiple correlation, using the equivalent pilot sequence; and
   a third unit configured to perform multiple correlation calculation for channel estimation using the sequence for multiple correlation;
   wherein the first unit is configured to:
   determine a phase complex multiplication coefficient using the historical valid frequency offset;
   multiply a local pilot sequence in a time domain with the phase complex multiplication coefficient; and
   transform the local pilot sequence in the time domain multiplied with the phase complex multiplication coefficient into a frequency domain to obtain the equivalent pilot sequence.

6. The apparatus according to claim 5, wherein the first unit is configured to determine the local pilot sequence in the time domain by:
   determining a local pilot sequence in the frequency domain; and
   transform the local pilot sequence in the frequency domain into the local pilot sequence in the time domain.

7. The apparatus according to claim 5, wherein the first unit is configured to determine the phase complex multiplication coefficient using the historical valid frequency offset by:
   determining a phase rotation vector using the historical valid frequency offset; and
   determining the phase complex multiplication coefficient according to the phase rotation vector.

8. The apparatus according to claim 5, wherein the second unit is configured to:
   determine, for each sample point of the equivalent pilot sequence, a square of a modulus of the sample point, and divide the sample point by the square of the modulus of the sample point to obtain the sequence for multiple correlation.

9. A computing device, comprising:
   a memory configured to store program instructions; and
   a processor configured to invoke the program instructions stored in the memory, and to execute the program instructions to perform the method according to claim 1.

* * * * *